(12) United States Patent
Umemoto et al.

(10) Patent No.: US 10,199,905 B2
(45) Date of Patent: Feb. 5, 2019

(54) COOLING MEDIUM SUPPLY/DISCHARGE DEVICE AND SUPERCONDUCTING ROTARY MACHINE INCLUDING COOLING MEDIUM SUPPLY/DISCHARGE DEVICE

(71) Applicant: KAWASAKI JUKOGYO KABUSHIKI KAISHA, Kobe-shi, Hyogo (JP)

(72) Inventors: Katsuya Umemoto, Akashi (JP); Satoru Takao, Akashi (JP); Kiyoshi Aizawa, Kobe (JP)

(73) Assignee: KAWASAKI JUKOGYO KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 14/437,617

(22) PCT Filed: Oct. 30, 2013

(86) PCT No.: PCT/JP2013/006422
§ 371 (c)(1),
(2) Date: Apr. 22, 2015

(87) PCT Pub. No.: WO2014/068971
PCT Pub. Date: May 8, 2014

(65) Prior Publication Data
US 2015/0280521 A1 Oct. 1, 2015

(30) Foreign Application Priority Data
Nov. 1, 2012 (JP) .................................. 2012-242026

(51) Int. Cl.
*H02K 9/197* (2006.01)
*H02K 9/10* (2006.01)
(Continued)

(52) U.S. Cl.
CPC ............... *H02K 9/10* (2013.01); *H02K 9/197* (2013.01); *H02K 9/20* (2013.01); *H02K 55/04* (2013.01); *Y02E 40/625* (2013.01)

(58) Field of Classification Search
CPC .. H02K 9/19; H02K 5/20; H02K 9/10; H02K 9/193; H02K 9/197; H02K 9/20; H02K 1/32; H02K 55/04; Y02E 40/625
(Continued)

(56) References Cited

U.S. PATENT DOCUMENTS 3,626,717 A * 12/1971 Lorch .................... F16L 59/185
310/54
3,991,588 A * 11/1976 Laskaris ............... F16L 59/065
277/347
(Continued)

FOREIGN PATENT DOCUMENTS

JP 4064721 B2 3/2008
JP 2011-066993 A 3/2011

OTHER PUBLICATIONS

Feb. 10, 2014 International Search Report issued in PCT/JP2013/006422.

*Primary Examiner* — Quyen P Leung
*Assistant Examiner* — Robert E Mates
(74) *Attorney, Agent, or Firm* — Oliff PLC (57) ABSTRACT

A cooling medium supply/discharge device includes a cylindrical rotary casing which is rotatable with a rotary shaft of the rotor; a cylindrical stationary casing fixed such that the stationary casing extends inward relative to the rotary casing and coaxially with the rotary casing, the stationary and rotary casings being relatively rotatable; a first stationary cylindrical body which is inserted into the stationary casing such that the first stationary cylindrical body is not rotatable; a first rotary cylindrical body which is inserted into the first stationary cylindrical body with a gap such that the first
(Continued)

rotary cylindrical body is rotatable together with the rotary shaft; a second stationary cylindrical body which is inserted into the first stationary cylindrical body such that the second stationary cylindrical body is not rotatable; and a second rotary cylindrical body which is inserted into the first rotary cylindrical body and rotatable together with the rotary shaft.

6 Claims, 4 Drawing Sheets

(51) Int. Cl.
*H02K 9/20* (2006.01)
*H02K 55/04* (2006.01)

(58) Field of Classification Search
USPC .......................... 310/52, 58, 54, 55, 59, 61
See application file for complete search history.

(56) References Cited

U.S. PATENT DOCUMENTS

| | | | | |
|---|---|---|---|---|
| 4,101,793 | A | * | 7/1978 | Berthet .................. H02K 9/19 277/420 |
| 4,155,019 | A | * | 5/1979 | Weghaupt ............... H02K 9/19 310/165 |
| 2006/0082228 | A1 | * | 4/2006 | Urbahn .................. H02K 9/20 310/52 |
| 2012/0204580 | A1 | * | 8/2012 | Umemoto ............. H02K 55/04 62/50.7 |

* cited by examiner

COOLING MEDIUM SUPPLY/DISCHARGE DEVICE AND SUPERCONDUCTING ROTARY MACHINE INCLUDING COOLING MEDIUM SUPPLY/DISCHARGE DEVICE

TECHNICAL FIELD

The present invention relates to a cooling medium supply/discharge device which supplies to a superconducting rotary device a cooling medium (refrigerant) used to cool a superconducting coil of the superconducting rotary device to a temperature at which the superconducting coil is retained in a superconductive state, and which discharges the cooling medium from the superconducting rotary device, and a superconducting rotary machine including the cooling medium supply/discharge device.

BACKGROUND ART

As a conventional example of a cooling medium supply/discharge device which cools a superconducting coil of a superconducting rotary device to a temperature at which the superconducting coil is retained in a superconductive state, there is disclosed a structure which is provided between a rotor of the superconducting rotary device and a refrigerating device as a supply source of a cooling medium (refrigerant) with an extremely low temperature, such as helium gas, to supply the cooling medium to the superconducting rotary device and discharge the cooling medium from the superconducting rotary device (e.g., see Patent Literature 1, 2).

This cooling medium supply/discharge device includes an inlet cooling tube and an outlet cooling tube which are coaxial with the rotary shaft of the rotor of the superconducting rotary device. The outlet cooling tube has a larger bore diameter than the inlet cooling tube. The inlet cooling tube is provided inside the outlet cooling tube. The inlet cooling tube is configured to introduce the cooling medium from the refrigerating device into the rotary shaft of the superconducting rotary device. The outlet cooling tube is configured to return to the refrigerating device the cooling medium discharged from the rotary shaft of the superconducting rotary device, in a location which is outward relative to the inlet cooling tube. The inlet cooling tube and the outlet cooling tube are fixed to the rotary shaft of the superconducting rotary device, and configured as rotary tubes, respectively, which rotate according to the rotation of the rotary shaft.

In the structure disclosed in Patent Literature 1, it is necessary to rotate the rotary shaft of the superconducting rotary device with respect to the refrigerating device. Therefore, a stationary tube fixed to the refrigerating device or other part which is in the vicinity of the refrigerating device, and a rotary tube are slidable via a seal member to prevent a leakage of the cooling medium from a coupling portion of the stationary tube and the rotary tube. However, if heat is generated by the sliding operation of the stationary tube and the rotary tube, the temperature of the cooling medium is increased, or the seal member is degraded, and thereby the life is shortened. To avoid this, in the structure disclosed in Patent Literature 2, a small gap is formed in a portion of the stationary tube and a portion of the rotary tube which portions overlap with each other in such a way that they do not slide with respect to each other, and a recess is provided on the outer peripheral surface of one of the stationary tube and the rotary tube, which has a smaller diameter, thereby controlling the leak amount of the cooling medium in the coupling portion.

CITATION LIST

Patent Literature

Patent Literature 1: Japanese Patent Publication No. 4064721 (FIG. 9)
Patent Literature 2: Japanese Laid-Open Patent Application Publication No. 2011-66993 (FIG. 2)

SUMMARY OF INVENTION

Technical Problem

However, in the above described structures, there is a need for a structure for supporting the cooling medium supply/discharge device which is placed separately from the superconducting rotary device. This makes the structure of the device complex and increases manufacturing cost. In addition, since the cooling medium supply/discharge device is placed apart from the tip end of the rotary shaft of the superconducting rotary device, in a direction that is away from the base end of the rotary shaft, the length in a rotary shaft direction, which is a sum of the length of the superconducting rotary device and the length of the cooling medium supply/discharge device, is increased.

The present invention has been developed to solve the above described problem, and an object of the present invention is to provide a cooling medium supply/discharge device, and a superconducting rotary machine including the cooling medium supply/discharge device, which can reduce the axial length of the machine with a simple structure.

Solution to Problem

According to an aspect of the present invention, there is provided a cooling medium supply/discharge device of a superconducting rotary device, the cooling medium supply/discharge device being placed between a refrigerating device and a rotor including a superconducting coil in the superconducting rotary device, to supply a gaseous supply cooling medium which is supplied from the refrigerating device to the rotor and return a gaseous return cooling medium returned from the rotor to the refrigerating device, the cooling medium supply/discharge device comprising: a cylindrical rotary casing which is rotatable together with a rotary shaft of the rotor; a cylindrical stationary casing fixed such that the stationary casing extends inward relative to the rotary casing and coaxially with the rotary casing and relative rotation between the stationary casing and the rotary casing via a bearing is allowed to occur; a first stationary cylindrical body which is inserted into the stationary casing such that the first stationary cylindrical body is not rotatable; a first rotary cylindrical body which is inserted into the first stationary cylindrical body with a gap such that the first rotary cylindrical body is rotatable together with the rotary shaft; a second stationary cylindrical body which is inserted into the first stationary cylindrical body such that the second stationary cylindrical body is not rotatable; and a second rotary cylindrical body which is inserted into the first rotary cylindrical body, fitted to the second stationary cylindrical body with a gap, and rotatable together with the rotary shaft, wherein a flow passage of the gaseous supply cooling medium is provided inside the second stationary cylindrical body and the second rotary cylindrical body, and wherein a flow passage of the gaseous return cooling medium is provided between the first stationary cylindrical body and the second stationary cylindrical body, and between the first rotary cylindrical body and the second rotary cylindrical body.

In accordance with this configuration, the flow passage of the gaseous supply cooling medium is formed by the second stationary cylindrical body and the second rotary cylindrical body, while the flow passage of the gaseous return cooling medium is formed by the first stationary cylindrical body, the second stationary cylindrical body, the first rotary cylindrical body, and the second rotary cylindrical body. Since the rotary casing is located outward relative to the stationary casing, and the first stationary cylindrical body is positioned inward relative to and in close proximity to the stationary casing, the rotary section can be integrated with the rotary shaft of the superconducting rotary device while preventing a vibration generated by the relative rotation of the rotary casing from being transmitted to the first stationary cylindrical body. The above described configuration can eliminate a need for a structure for supporting the cooling medium supply/discharge device, and simplify the structure. Since the rotary casing is located at an outermost side, the cooling medium supply/discharge device can be easily mounted to the rotary shaft without using a complex structure in a state in which the cooling medium supply/discharge device is accommodated into the rotary shaft of the superconducting rotary device. Therefore, the axial length of the machine can be reduced with a simple structure.

A first fitting section at which the first stationary cylindrical body and the first rotary cylindrical body are fitted to each other and a second fitting section at which the second stationary cylindrical body and the second rotary cylindrical body are fitted to each other may be positioned axially inward relative to the rotary casing. In this configuration, since the first fitting section and the second fitting section are positioned axially inward relative to the rotary casing, the axial length of the machine can be reduced. In addition, the first rotary cylindrical body and the second rotary cylindrical body can be reduced in length. In general, the rotary cylindrical body has a cantilever structure in which the rotary cylindrical body is supported only on the rotary shaft of the superconducting rotary device. Because of this, if the axial length of the rotary cylindrical body is increased, manufacturing accuracy cannot be made high or manufacturing cost increases. Therefore, by reducing the first rotary cylindrical body and the second rotary cylindrical body in length, manufacturing accuracy can be kept high or manufacturing cost can be reduced.

A space formed between the rotary casing and the stationary casing may be sealed by a magnetic fluid seal member. The magnetic fluid seal member makes it possible to prevent the gaseous cooling medium which leaks from the first fitting section, from leaking to outside air.

Each of the cylindrical bodies may be constituted by a double-walled pipe, and a space formed by the double-walled pipe may be configured as a vacuum heat insulating layer. In this configuration, since each of the flow passages of the gaseous cooling medium is isolated from other regions via the vacuum heat insulating layer, a temperature increase in the gaseous cooling medium can be suppressed effectively.

A gap of the first fitting section may be in communication with a space formed between the rotary casing and the stationary casing, and a gap of the second fitting section may be in communication with a flow passage of the gaseous return cooling medium. In this configuration, even if the gaseous cooling medium leaks from the small gap, it is possible to prevent this cooling medium from contacting outside air. As a result, a temperature increase in the gaseous cooling medium can be suppressed more effectively.

The second stationary cylindrical body may be inserted into the second rotary cylindrical body with a gap. In this configuration, in the flow passage of the gaseous supply cooling medium, a path connecting the inner side of the second fitting section to the outer side of the second fitting section by the gap of the second fitting section extends in a direction that is opposite to the travelling direction of the gaseous cooling medium toward the superconducting rotary device (supply direction). Therefore, it becomes possible to lessen the amount of the gaseous supply cooling medium which leaks from the second fitting section.

According to an aspect of the present invention, there is provided a superconducting rotary machine comprising: a superconducting rotary device including a rotor including a superconducting coil; a refrigerating device which flows a gaseous cooling medium to the rotor; and a cooling medium supply/discharge device of the superconducting rotary device, the cooling medium supply/discharge device being placed between a refrigerating device and a rotor including a superconducting coil in the superconducting rotary device, to supply a gaseous supply cooling medium which is supplied from the refrigerating device to the rotor and return a gaseous return cooling medium returned from the rotor to the refrigerating device, the cooling medium supply/discharge device comprising: a cylindrical rotary casing which is rotatable together with a rotary shaft of the rotor; a cylindrical stationary casing fixed such that the stationary casing extends inward relative to the rotary casing and coaxially with the rotary casing and relative rotation between the stationary casing and the rotary casing via a bearing is allowed to occur; a first stationary cylindrical body which is inserted into the stationary casing such that the first stationary cylindrical body is not rotatable; a first rotary cylindrical body which is inserted into the first stationary cylindrical body with a gap such that the first rotary cylindrical body is rotatable together with the rotary shaft; a second stationary cylindrical body which is inserted into the first stationary cylindrical body such that the second stationary cylindrical body is not rotatable; and a second rotary cylindrical body which is inserted into the first rotary cylindrical body, fitted to the second stationary cylindrical body with a gap, and rotatable together with the rotary shaft, wherein a flow passage of the gaseous supply cooling medium is provided inside the second stationary cylindrical body and the second rotary cylindrical body, and wherein a flow passage of the gaseous return cooling medium is provided between the first stationary cylindrical body and the second stationary cylindrical body, and between the first rotary cylindrical body and the second rotary cylindrical body.

In accordance with this configuration, the flow passage of the gaseous supply cooling medium is formed by the second stationary cylindrical body and the second rotary cylindrical body, while the flow passage of the gaseous return cooling medium is formed between the first stationary cylindrical body and the second stationary cylindrical body and between the first rotary cylindrical body and the second rotary cylindrical body. Since the rotary casing is located outward relative to the stationary casing, and the first stationary cylindrical body is positioned inward relative to and in close proximity to the stationary casing, the rotary section can be integrated with the rotary shaft of the superconducting rotary device while preventing a vibration generated by the relative rotation of the rotary casing from being transmitted to the first stationary cylindrical body. The above described configuration can eliminate a need for a structure for supporting the cooling medium supply/discharge device, and simplify the structure. Since the rotary casing is located at an outermost side, the cooling medium supply/discharge device can be easily mounted to the rotary shaft without using a complex structure in a state in which the cooling medium supply/discharge device is accommodated into the rotary shaft of the superconducting rotary device. Therefore, the axial length of the machine can be reduced with a simple structure.

The above and further objects, features and advantages of the invention will more fully be apparent from the following detailed description with reference to the accompanying drawings.

Advantageous Effects of Invention

The present invention is configured as described above, and it becomes possible to achieve an advantage that the axial length of the machine can be reduced in length, with a simple structure.

DESCRIPTION OF EMBODIMENTS

<Outline of the Invention>

First of all, the outline of the present invention will be described. As described previously, the present invention is intended to solve the problem associated with the conventional cooling medium supply/discharge device that there is a need for the structure for supporting the cooling medium supply/discharge device which is placed separately from the superconducting rotary device, and the length in the rotary shaft direction, which is a sum of the length of the superconducting rotary device and the length of the cooling medium supply/discharge device, is increased. The present inventors intensively studied the problem associated with the prior art, and discovered a finding that if the cooling medium supply/discharge device can be accommodated into the rotary shaft of the superconducting rotary device in order to reduce the length in the rotary shaft direction, the length of a cooling medium supply/discharge mechanism (as will be described later) and the length of the superconducting rotary device can be made theoretically equal to the length of the rotary shaft of the superconducting rotary device, and in this way, the length of the machine in the rotary shaft direction can be reduced.

However, the conventional cooling medium supply/discharge device has a structure in which the stationary section is located at an outer side and the rotary section is located at an inner side. Because of this, the conventional cooling medium supply/discharge device cannot be fixed to inside the rotary shaft of the superconducting rotary device, without modifying its structure. Specifically, it is required that the stationary section located at an outer side in the cooling medium supply/discharge device and the inner wall of the rotary shaft be mounted to each other such that the relative rotation between the fixed section and the rotary shaft via a bearing or the like is allowed to occur. This results in a complex structure. In addition, since the rotary shaft and the cooling medium supply/discharge device cannot be integrated, there causes a need for a structure for supporting the cooling medium supply/discharge device. Because of this, it would be difficult to accommodate the conventional cooling medium supply/discharge device into the rotary shaft of the superconducting rotary device, unless its structure is modified. Under the circumstances, the above stated problem remains unsolved.

After intensive study, the present inventors conceived that the cooling medium supply/discharge device is accommodated into and integrated with the rotary shaft of the superconducting rotary device, by locating the rotary section outward relative to the stationary section in the cooling medium supply/discharge device. This makes it possible to integrate the rotary shaft of the superconducting rotary device and the rotary section located at the outer side in the cooling medium supply/discharge device in a state in which the cooling medium supply/discharge device is accommodated into the rotary shaft of the superconducting rotary device, without providing the complex structure as described above. Typically, the rotary shaft of the superconducting rotary device has high stiffness. Therefore, a structure for supporting the rotary shaft is not necessary. Because of the omission of the support structure of the cooling medium supply/discharge device, the entire machine can be simplified in structure. In addition, since the cooling medium supply/discharge device is accommodated into the rotary shaft of the superconducting rotary device, the length of the machine in the rotary shaft direction can be reduced.

Hereinafter, the embodiment of the present invention will be described with reference to the drawings. Throughout the drawings, the same or corresponding components are designated by the same reference symbols and will not be described repeatedly.

<Configuration of Cooling Medium Supply/Discharge Device>

Figure 1:
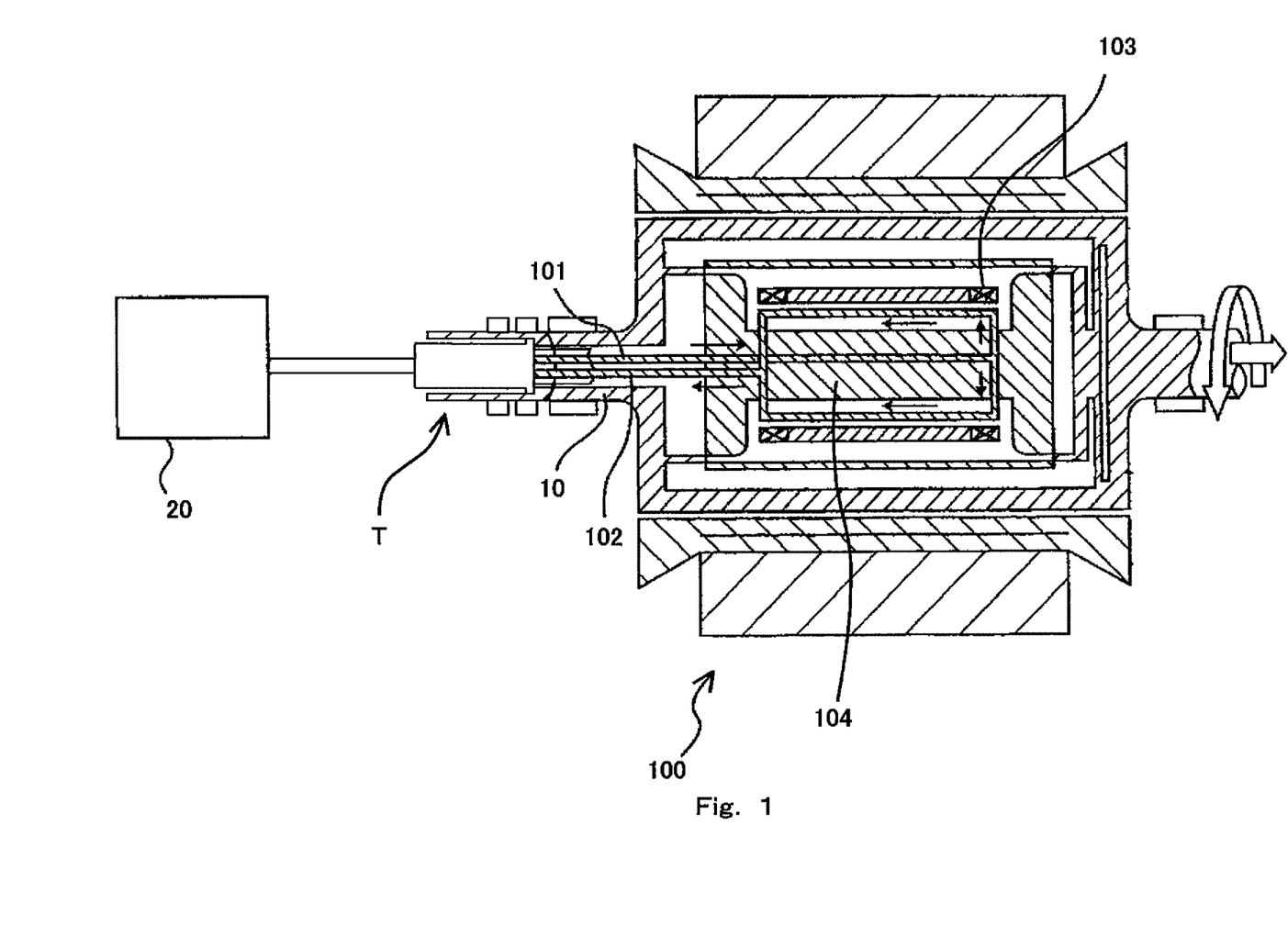
FIG. 1 is a schematic view showing the configuration of a superconducting rotary machine into which a cooling medium supply/discharge device according to an embodiment of the present invention is incorporated.

FIG. 1 is a schematic view showing the configuration of a superconducting rotary machine into which a cooling medium supply/discharge device according to an embodiment of the present invention is incorporated. As shown in FIG. 1, a cooling medium supply/discharge device T of the present embodiment is placed between a rotary shaft 10 of a rotor of a superconducting rotary device 100 and a refrigerating device 20. The cooling medium supply/discharge device T is configured to supply a cooling medium (supply cooling medium), for example, a gaseous cooling medium such as helium gas, which has been cooled to a predetermined temperature (extremely low temperature) by the refrigerating device 20 to a superconducting coil 103 of the rotor via a cooling medium supply pipe 101 to cool the entire of a rotor core 104 with this supply cooling medium and cool the superconducting coil 103 to, for example, about 30K, by conduction cooling. The cooling medium (return cooling medium) which has gone through heat exchange is returned to the refrigerating device 20 via a cooling medium discharge pipe 102. Thus, a superconducting rotary machine is configured to include the superconducting rotary device 100, the refrigerating device 20, and the cooling medium supply/discharge device T.

Figure 2:
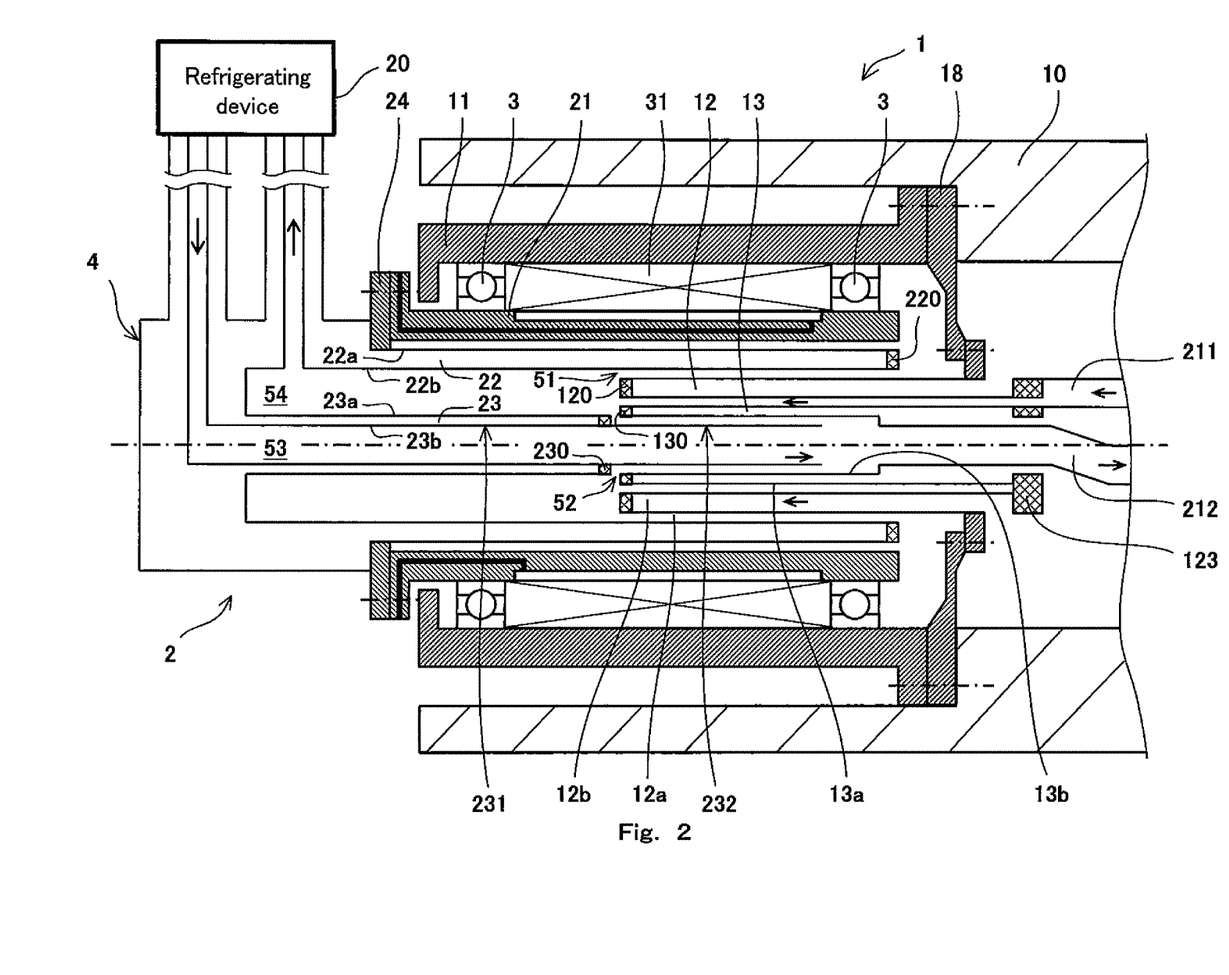
FIG. 2 is a cross-sectional side view showing the detailed structure of the cooling medium supply/discharge device of FIG. 1.

Next, the detailed structure of the cooling medium supply/discharge device T of the present embodiment will be described. FIG. 2 is a cross-sectional side view showing the detailed structure of the cooling medium supply/discharge device of FIG. 1. In FIG. 2, the right side is the side which is closer to superconducting rotary device side, while the left side is the side which is closer to the refrigerating device side.

As shown in FIG. 2, the cooling medium supply/discharge device T includes a rotary section 1 fixed to a rotary shaft 10 of the superconducting rotary device 100 and a stationary section 2 fixed to a cooling medium supply/discharge mechanism 4 to supply and discharge of the cooling medium of the refrigerating device 20. In the present embodiment, the stationary section 2 and the cooling medium supply/discharge mechanism 4 are integrated. The rotary section 1 includes a cylindrical rotary casing 11 which is rotatable together with the rotary shaft 10 of the rotor, a first rotary cylindrical body 12 placed coaxially with the rotary shaft 10, and a second rotary cylindrical body 13 placed coaxially with the rotary shaft 10. The rotary casing 11 is connected to the rotary shaft 10 via a joint member (not shown). The rotary casing 11 and the joint member may not be completely fixed to each other (some slack may be formed in circumferential direction and/or axial direction). The stationary section 2 includes a cylindrical stationary casing 21 which is placed radially inward relative to the rotary casing 11 and coaxially with the rotary casing 11 such that relative rotation between the stationary casing 21 and the rotary casing 11 via a bearing 3 is allowed to occur, a first stationary cylindrical body 22 placed coaxially with the rotary shaft 10, and a second stationary cylindrical body 23 placed coaxially with the rotary shaft 10. The stationary casing 21 is fixed to the cooling medium supply/discharge mechanism 4.

The rotary shaft 10 is formed of a substantially cylindrical member extending axially and located closer to the superconducting rotary device. The cooling medium supply pipe 101 which is a single pipe is placed at the center portion of the rotary shaft 10. The cooling medium discharge pipe 102 is placed along the cooling medium supply pipe 101. The cooling medium supply pipe 101 and the cooling medium discharge pipe 102 are in communication with the interior of the rotor core 104 of the superconducting rotary device 100 (see FIG. 1). The end portion of the rotary shaft 10 has a hollow shape to allow the cooling medium supply/discharge device T to be inserted therethrough, as will be described later.

The rotary casing 11 is connected to the flange portion of a joint member mounted inside the rotary shaft 10. A support member 18 supporting the first rotary cylindrical body 12 is fixed to the rotary casing 11. The rotary casing 11 has a shape in which its end portion which is closer to the refrigerating device extends radially inward. Bearings 3 are mounted inside the rotary casing 11. One bearing 3 is mounted to each of the end portion of the rotary casing 11 which is closer to the refrigerating device and the end portion of the rotary casing 11 which is closer to the superconducting rotary device, respectively. The first rotary cylindrical body 12 is fixed to the support member 18 in such a manner that the first rotary cylindrical body 12 is inserted into the rotary casing 11 with a predetermined gap, in a radially inward location. The second rotary cylindrical body 13 is inserted into the first rotary cylindrical body 12 with a predetermined gap, in a radially inward location. The first rotary cylindrical body 12 is supported in a location which is closer to the rotary shaft 10 in a cantilever manner, although this is not shown.

The stationary casing 21 has a flange portion at its end portion which is closer to the refrigerating device, and the flange is fixed to the refrigerating device 20. More specifically, the flange is fixed to the cooling medium supply/discharge mechanism 4 placed between the refrigerating device 20 and the stationary casing 21 to supply and discharge the cooling medium of the refrigerating device 20. That is, the stationary casing 21 is indirectly fixed to the refrigerating device 20 in such a manner that stationary casing 21 is fixed to the support member 24 supporting the stationary section 2. The support member 24 is fixed to a flame member (not shown) accommodating the stationary section 2. The first stationary cylindrical body 22 is fixed to the support member 24 in such a manner that first stationary cylindrical body 22 is inserted into the stationary casing 21 in a radially inward location, extends coaxially with the stationary casing 21 and with a predetermined gap with respect to the stationary casing 21, and relative rotation between the first stationary cylindrical body 22 and the stationary casing 21 does not occur. The second stationary cylindrical body 23 is inserted into the first stationary cylindrical body 22 in a radially inward location, extends coaxially with the first stationary cylindrical body 22 and with a predetermined gap with respect to the first stationary cylindrical body 22, and relative rotation between the second stationary cylindrical body 23 and the first stationary cylindrical body 22 does not occur.

Each of first stationary cylindrical body 22 and the second stationary cylindrical body 23 is constituted by a double-walled pipe. More specifically, the first stationary cylindrical body 22 includes an outer pipe 22a and an inner pipe 22b. A space formed between the outer pipe 22a and the inner pipe 22b, of the end portion of the first stationary cylindrical body 22 which portion is closer to the superconducting rotary device, is sealed by an annular seal member 220. A space formed between the outer pipe 22a and the inner pipe 22b, of the end portion of the first stationary cylindrical body 22 which portion is closer to the refrigerating device, is opened. Likewise, the second stationary cylindrical body 23 includes an outer pipe 23a and an inner pipe 23b. A space formed between the outer pipe 23a and the inner pipe 23b, of the end portion of the second stationary cylindrical body 23, which portion is closer to the superconducting rotary device, is sealed by an annular seal member 230. A space formed between the outer pipe 23a and the inner pipe 23b, of the end portion of the second stationary cylindrical body 23 which portion is closer to the refrigerating device, is opened.

Each of the first rotary cylindrical body 12 and the second rotary cylindrical body 13 also has a double-walled pipe structure. More specifically, the first rotary cylindrical body 12 includes an outer pipe 12a and an inner pipe 12b. A space formed between the outer pipe 12a and the inner pipe 12b, of the end portion of the first rotary cylindrical body 12 which portion is closer to the refrigerating device is sealed by an annular seal member 120. A space formed between the outer pipe 12a and the inner pipe 12b, of the end portion of the first rotary cylindrical body 12, which portion is closer to the superconducting rotary device, is opened. Likewise, the second rotary cylindrical body 13 includes an outer pipe 13a and an inner pipe 13b. A space formed between the outer pipe 13a and the inner pipe 13b, of the end portion of the second rotary cylindrical body 13 which portion is closer to the refrigerating device is sealed by an annular seal member 130. A space formed between the outer pipe 13a and the inner pipe 13b, of the end portion of the second rotary cylindrical body 13 which portion is closer to the superconducting rotary device, is opened.

The open ends of the cylindrical bodies 22, 23, 12, 13 are in communication with a vacuum chamber (not shown). A space formed by the double-walled pipe, of each of the cylindrical bodies 22, 23, 12, 13, i.e., space formed by the outer pipe and the inner pipe of each cylindrical body, and the seal member, is placed in a vacuum state, and thereby the interior of the space is configured as a vacuum heat insulating layer.

The end of a cylindrical space formed by the inner pipe 12b of the first rotary cylindrical body 12 and the outer pipe 13a of the second rotary cylindrical body 13, which end is closer to the refrigerating device, is opened, while the end of the cylindrical space which is closer to the superconducting rotary device is closed by an annular closing member 123. A through-hole is formed in a portion of the closing member 123. A discharge flexible hose 211 is connected to this through-hole. The end of a cylindrical space formed by the inner pipe 13b of the second rotary cylindrical body 13, which end is closer to the refrigerating device, is opened, while the end of the cylindrical space, which end is closer to the superconducting rotary device is connected to a supply flexible hose 212.

The first rotary cylindrical body 12 is fitted to the first stationary cylindrical body 22 with a radial gap. Specifically, the first rotary cylindrical body 12 and the first stationary cylindrical body 22 are coaxially placed such that they axially overlap with each other. This overlap portion is a first fitting section 51 with an annular gap. Specifically, the second rotary cylindrical body 13 is fitted to the second stationary cylindrical body 23 with a radial gap. The second rotary cylindrical body 13 and the second stationary cylindrical body 23 are coaxially placed such that they axially overlap with each other. This overlap portion is a second fitting section 52. The annular gap of the second fitting section 52 is set to a small distance (e.g., about 0.1 mm) which can prevent a contact between the second rotary cylindrical body 13 and the second stationary cylindrical body 23.

In the above described structure, the inner space of the second stationary cylindrical body 23, the inner space of the second rotary cylindrical body 13, and the inner space of the supply flexible hose 212 are formed as a flow passage 53 of the supply cooling medium from the refrigerating device. In addition, the space formed between the first stationary cylindrical body 22 and the second stationary cylindrical body 23, the space formed between the first rotary cylindrical body 12 and the second rotary cylindrical body 13, and the inner space of the discharge flexible hose 211, are formed as a flow passage 54 of the return cooling medium from the superconducting rotary device.

In the present embodiment, the second stationary cylindrical body 23 is inserted into the second rotary cylindrical body 13 with a gap. Specifically, the inner diameter (diameter of inner pipe 13b) of the second rotary cylindrical body 13 is set slightly larger than the outer diameter (diameter of the outer pipe 23a) of the second stationary cylindrical body 23. The first rotary cylindrical body 12 is inserted into the first stationary cylindrical body 22 with a gap. Specifically, the outer diameter (diameter of outer pipe 12a) of the first rotary cylindrical body 12 is set slightly smaller than the inner diameter (diameter of the inner pipe 22b) of the first stationary cylindrical body 22.

In the present embodiment, the second stationary cylindrical body 23 includes a first member 231 which is closer to the refrigerating device, and a second member 232 which is closer to the superconducting rotary device. The first member 231 is formed by a double-walled pipe. The second fitting section 52 is formed by axially overlapping the second member 232 of the second stationary cylindrical body 23 and the second rotary cylindrical body 13 with each other. A plurality of ring-shaped grooves (not shown) are formed on the outer surface of the second member 232 such that the grooves are arranged at equal pitches in an axial direction. Alternatively, the grooves may be formed on the outer surface of the second member 232 such that the grooves are arranged at uneven pitches in the axial direction.

The second member 232 may be manufactured by using ultrahigh molecular weight polyethylene fiber, for example, Dyneema (registered mark) or Spectra (manufactured by Honeywell Co., Ltd.). Dyneema (registered mark) or Spectra (manufactured by Honeywell Co., Ltd.) has a high strength and a high heat conductivity. These materials can be formed into a member with a negative linear expansion coefficient by adjusting the angle of filament winding in a manufacturing process step. For example, in a case where the second member 232 is inserted into the second rotary cylindrical body 13 with a gap, the second member 232 is radially expanded by the cooling action of the cooling medium. This allows the second member 232 to be fixed to the second rotary cylindrical body 13 without being disengaged therefrom.

In addition to the grooves formed on the outer surface of the first rotary cylindrical body 12 having the double-walled pipe structure, in the first fitting section 51, the first rotary cylindrical body 12 may be axially divided into two members, and the grooves may be formed on the outer surface of the member which is closer to the refrigerating device, in the first fitting section 51. Or, instead of forming the grooves on the second member 232 of the second stationary cylindrical body 23, the grooves may be directly formed on the outer surface of the second stationary cylindrical body 23 (first member 231) having the double-walled pipe structure, as in the first rotary cylindrical body 12.

The material of the second member 232 is not limited to Dyneema (registered mark) or Spectra (manufactured by Honeywell Co., Ltd.), and may be polyethylene fiber reinforced plastic, etc. Or, instead of Dyneema (registered mark) or Spectra (manufactured by Honeywell Co., Ltd.), the material of the second member 232 may be polytetrafluoroethylene (PTFE) resin containing an organic based filling material. This makes it possible to prevent damages to the second member 232 such as cracks due to low-temperature embrittlement. Or, for example, the dimension tolerance of the inner pipe 13b of the second rotary cylindrical body 13 may be designed to have a negative value. The second member 232 manufactured by using the above material is highly compatible with the inner pipe 13b. Even if the convex portions of the continuous grooves contact the inner peripheral surface of the inner pipe 13b, heat generation is suppressed, and the effects on the cooling for the superconducting rotary device 100 can be lessened well.

A part of the grooves formed on the outer peripheral portion of the second member 232 may be filled with, for example, polytetrafluoroethylene (PTFE) or Teflon (registered mark), to form ring-shaped grooves on the outer peripheral portion of the second member 232 at uneven pitches in the axial direction.

The grooves formed on the outer peripheral portion of the second member 232 are not limited to the above described example. As the grooves formed on the outer peripheral portion of the second member 232, spiral grooves which are axially continuous or discontinuous may be used. The spiral grooves may be formed to allow the cooling medium staying in adjacent recesses to be pushed back into the cooling medium supply passage 53 according to the rotation of the second rotary cylindrical body 13 (rotary section 1).

Furthermore, the grooves formed on the outer peripheral portion of the second member 232 may be suitably modified so long as they allow the above stated action to occur. For example, rectangular recesses which are distributed in a circumferential direction may be formed on the outer peripheral portion of the second member 232. In this case, the recesses are preferably configured such that the length of the bottom surface of the groove, which is between the walls, is larger than the height of walls. Moreover, these grooves of a large number may be distributed unevenly on the outer peripheral portion of the second member 232. For example, the grooves may be formed obliquely on the outer peripheral portion of the second member 232.

The first fitting section 51 and the second fitting section 52 configured as described above are positioned axially inward relative to the rotary casing 11 (axially inward relative to the end portion of the rotary casing 11 which is closer to the refrigerating device and the end portion of the rotary casing 11 which is closer to the superconducting rotary device). Since the first fitting section 51 and the second fitting section 52 are positioned axially inward relative to the rotary casing 11, the axial length of the machine can be further reduced. In addition, the first rotary cylindrical body 12 and the second rotary cylindrical body 13 can be reduced in length. In general, the rotary cylindrical body has a cantilever structure in which the rotary cylindrical body is supported only on the rotary shaft of the superconducting rotary device. Because of this, if the axial length of the rotary cylindrical body is increased, manufacturing accuracy cannot be made high or manufacturing cost increases. Therefore, by reducing the first rotary cylindrical body 12 and the second rotary cylindrical body 13 in length, manufacturing accuracy can be kept high or manufacturing cost can be reduced.

A space formed between the rotary casing 11 and the stationary casing 21 is sealed by a magnetic fluid seal member 31. Specifically, the magnetic fluid seal member 31 is filled into the space defined by the two bearings 3, the rotary casing 11 and the stationary casing 21. The circumferential speed of the rotary shaft 10 (rotary section 1) is set to a proper value which can prevent the oil component of the magnetic fluid seal member 31 from being scattered due to heat generation attributed to the internal viscosity of the magnetic fluid seal member 31. Also, the gap of the first fitting section 51 is in communication with the space formed between the rotary casing 11 and the stationary casing 21. In this structure, even if the return cooling medium leaks from the flow passage 54 of the return cooling medium in the first fitting section 51, this cooling medium flows from a region between the base end portion (end portion which is closer to the superconducting rotary device) of the rotary casing 11 and the tip end portion (end portion which is closer to the superconducting rotary device) of the stationary casing 21, into the space formed between the rotary casing 11 and the stationary casing 21. The magnetic fluid seal member 31 filled into this space makes it possible to prevent a leakage of this cooling medium to outside air.

Likewise, the gap of the second fitting section 52 is in communication with the flow passage 54 of the return cooling medium. In this structure, even if the supply cooling medium leaks from the flow passage 53 of the supply cooling medium in the second fitting section 52, this cooling medium flows to the flow passage 54 of the return cooling medium. Therefore, a leakage of the cooling medium to outside can be prevented.

In the above described configuration, even if the cooling medium leaks from the gap of each of the fitting sections, it is possible to prevent this cooling medium from contacting outside air. As a result, a temperature increase in the cooling medium can be suppressed more effectively.

<Operation of Cooling Medium Supply/Discharge Device>

Next, the operation of the cooling medium supply/discharge device of the present embodiment will be described.

As shown in FIG. 2, the cooling medium (e.g., helium gas) kept at a predetermined extremely low temperature by the refrigerating device 20 is supplied as the supply cooling medium from the refrigerating device 20 to the interior of the rotary shaft 10 of the superconducting rotary device via the cooling medium supply/discharge mechanism 4 and the flow passage 53 of the supply cooling medium.

Then, as shown in FIG. 1, the supply cooling medium is introduced into the superconducting rotary device 100. The supply cooling medium cools the entire rotor core 104 included in the superconducting rotary device 100, and cools the superconducting coil 103 retained in the rotor core 104 to a predetermined temperature (e.g., about 30K) by conduction cooling, thereby allowing the superconducting coil 103 to be retained in a superconductive state. As shown in FIG. 2, the cooling medium which has cooled the superconducting coil 103 to the predetermined temperature by the heat exchange, is returned as the return cooling medium from the rotary shaft 10 to the refrigerating device 20 via the flow passage 54 of the return cooling medium and the cooling medium supply/discharge mechanism 4.

In the cooling medium supply/discharge device of the present embodiment, the leak amount of the cooling medium is controlled in the second fitting section 52 formed between the second stationary cylindrical body 23 and the second rotary cylindrical body 13 defining the flow passage 53 of the supply cooling medium and in the first fitting section 51 formed between the first rotary cylindrical body 12 and the first stationary cylindrical body 22 defining the flow passage 54 of the return cooling medium.

As described above, the cooling medium supply/discharge device of the present embodiment is basically different in configuration from the structure disclosed in Patent Literature 1, in which the stationary seal and the rotary seal may contact each other. Thus, the cooling medium supply/discharge device of the present embodiment can eliminate the problem that maintenance cost of the device increases, or the temperature of cooling gas increases, due to the contact between the stationary member and the rotary member.

In addition, in the cooling medium supply/discharge device of the present embodiment, the flow passage 53 of the supply cooling medium is formed by the second stationary cylindrical body 23 and the second rotary cylindrical body 13, while the flow passage 54 of the return cooling medium is formed by the first stationary cylindrical body 22, the second stationary cylindrical body 23, the first rotary cylindrical body 12, and the second rotary cylindrical body 13. Since the rotary casing 11 is located outward relative to the stationary casing 21, and the first stationary cylindrical body 22 is positioned inward relative to and in close proximity to the stationary casing 21, the rotary section 1 can be integrated with the rotary shaft 10 of the superconducting rotary device 100 while preventing a vibration generated by the relative rotation of the rotary casing 11 from being transmitted to the first stationary cylindrical body 22.

The above described configuration can eliminate a need for a structure for supporting the cooling medium supply/discharge device T, and simplify the structure. Since the rotary casing 11 is located at an outermost side, the cooling medium supply/discharge device T can be easily mounted to the rotary shaft 10 without using a complex structure in a state in which the cooling medium supply/discharge device T is accommodated into the rotary shaft 10 of the superconducting rotary device 100. Therefore, the axial length of the machine can be reduced, with a simple structure.

Since the rotary cylindrical bodies 12, 13 of the rotary section 1 and the stationary cylindrical bodies 22, 23 of the stationary section 2 are placed in such a manner that the rotary cylindrical bodies 12, 13 partially overlap with the stationary cylindrical bodies 22, 23, respectively, in the rotary shaft direction, the cooling medium supply/discharge device can be simplified and made compact in structure.

In the above structure in which the rotary section 1 and the stationary section 2 partially overlap with each other in the rotary shaft direction, in order to stably control the leak amount of the cooling medium, it is necessary to ensure the axial length of the overlap portion of the rotary cylindrical body 12 and of the stationary cylindrical body 22 in the first fitting section 51, and the axial length of the overlap portion of the rotary cylindrical body 13 and of the stationary cylindrical body 23 in the second fitting section 52. In the structure disclosed in Patent Literature 2 in which the rotary section is mounted inside the stationary section, it is sometimes necessary to extend the overlap portion to a location which is axially outward relative to the casing of the cooling medium supply/discharge device. This causes a need to increase the length of the rotary section. The axial length of the rotary shaft of the superconducting rotary device and the axial length of the rotary section connected to the rotary shaft increase. As a result, it becomes difficult to reduce the entire superconducting rotary machine in size.

In contrast, in the cooling medium supply/discharge device of the present embodiment, the rotary casing 11 is located outward relative to the stationary casing 21. This allows the rotary section 1 to be integrated with the rotary shaft 10 of the superconducting rotary device. Therefore, the axial length of the machine can be reduced.

In the present embodiment, in the second fitting section 52, the second stationary cylindrical body 23 located at an upstream side of the flow passage 53 of the supply cooling medium is located radially inward relative to the second rotary cylindrical body 13 located at a downstream side. Because of this, the gap formed in the second fitting section 52 extends in a direction that is opposite to the travelling direction (direction in which the supply cooling medium is supplied from the refrigerating device to the superconducting rotary device) of the supply cooling medium. Likewise, in the first fitting section 51, the first rotary cylindrical body 12 and the second rotary cylindrical body 13 which are located at an upstream side of the flow passage 54 of the return cooling medium are located between the first stationary cylindrical body 22 and the second stationary cylindrical body 23 which are located at a downstream side. Because of this, the gap formed in the first fitting section 51 extends in a direction that is opposite to the travelling direction (direction in which the return cooling medium is discharged from the superconducting rotary device to the refrigerating device) of the return cooling medium. As described above, the flow passage 53 of the supply cooling medium is provided with the gap formed in the first fitting section 51 so as to extend in the direction that is opposite to the travelling direction of the supply cooling medium, while the flow passage 54 of the return cooling medium is provided with the gap formed in the second fitting section 52 so as to extend in the direction that is opposite to the travelling direction of the return cooling medium. Therefore, the amount of the cooling medium which leaks from each of the fitting sections 51, 52 can be further reduced.

In the present embodiment, the end portion of the gap formed in the first fitting section 51, which end portion contacts outside air (i.e., end portion of the first stationary cylindrical body 22 which is closer to the superconducting rotary device in the present embodiment) is located at substantially axially the same position as that of the end portion of the rotary casing 11 which is closer to the superconducting rotary device. This allows the first fitting section 51 (and second fitting section 52) to be naturally positioned axially inward relative to the casing 11, 12. As described above, it is necessary to ensure the axial length of the overlap portion of the rotary cylindrical body 12 and of the stationary cylindrical body 22 in the first fitting section 51, and the axial length of the overlap portion of the rotary cylindrical body 13 and of the stationary cylindrical body 23 in the second fitting section 52. In the case of the conventional structure in which the rotary section is mounted inside the stationary section, in order to form a small gap in each fitting section in a direction that is opposite to the traveling direction of the cooling medium while placing the cooling medium supply passage radially inward relative to the cooling medium discharge passage, it becomes necessary to provide the fitting sections (overlap portions of the cylindrical bodies) axially outward relative to the casing (specifically, in an outward location which is closer to the refrigerating device), which increases the axial length of the entire machine. In contrast, in the present embodiment, since the rotary casing 11 is positioned outward relative to the stationary casing, it becomes possible to easily form the structure in a simple manner in which the first fitting section 51 and the second fitting section 52 are located axially inward relative to the rotary casing 11, while extending the gap in each of the fitting sections 51, 52 in a direction that is opposite to the traveling direction of the cooling medium.

Modified Example

Figure 3:
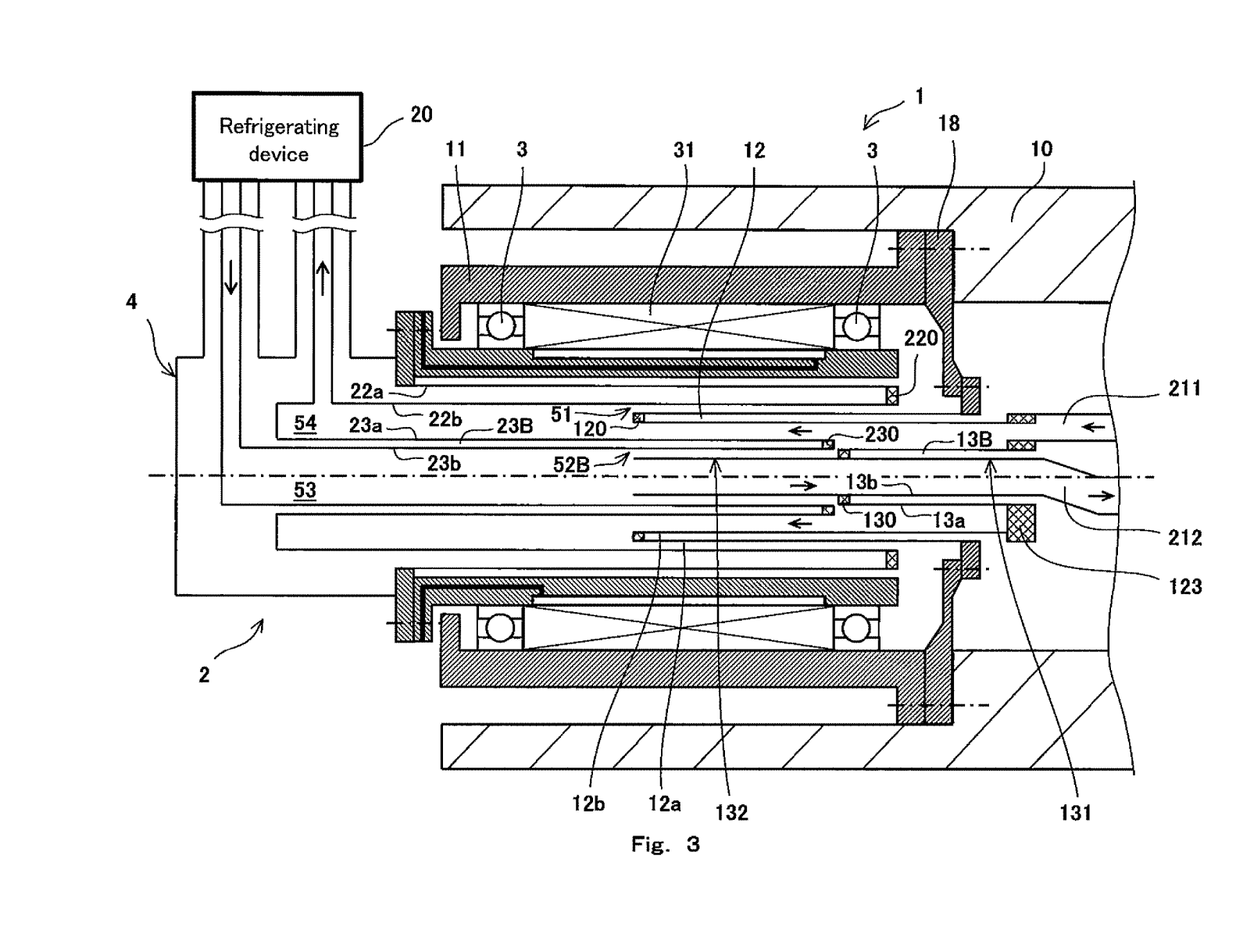
FIG. 3 is a cross-sectional side view showing the detailed structure of a cooling medium supply/discharge device according to Modified example 1 of the embodiment of the present invention.

Hereinafter, the modified example of the cooling medium supply/discharge device according to the embodiment of the present invention will be described. FIG. 3 is a cross-sectional side view showing the detailed structure of a cooling medium supply/discharge device according to Modified example 1 of the embodiment of the present invention. In the present modified example, the same components as those of the above described embodiment are designated by the same reference symbols and will not be described repeatedly. The cooling medium supply/discharge device according to the present modified example is different from that of the above described embodiment in that in the present modified example, a second rotary cylindrical body 13B is inserted into a second stationary cylindrical body 23B with a gap. Specifically, the outer diameter (diameter of outer pipe 13a) of the second rotary cylindrical body 13B is set slightly smaller than the inner diameter (diameter of the inner pipe 23b) of the second stationary cylindrical body 23B.

Specifically, the second rotary cylindrical body 13B includes a first member 131 which is closer to the superconducting rotary device and a second member 132 which is closer to the refrigerating device. The first member 131 is constituted by a double-walled pipe. The second fitting section 52B is formed by overlapping the second member 132 of the second rotary cylindrical body 13B and the second stationary cylindrical body 23 with each other. A plurality of ring-shaped grooves are formed on the outer surface of the second member 132 such that the grooves are arranged at equal pitches in the axial direction.

In accordance with this configuration, also, the rotary section 1 can be integrated with the rotary shaft 10 of the superconducting rotary device, and the axial length of the machine can be reduced as compared to the conventional example. In particular, the supply cooling medium and the return cooling medium allow the cylindrical bodies and the flow passages to be maintained at extremely low temperatures, respectively. For this reason, a pressure difference (difference in expansion rate of cooling medium) due to a temperature difference between the flow passage 53 of the supply cooling medium and the flow passage 54 of the return cooling medium is not significant. By appropriately setting the gap in the second fitting section 52B, it becomes possible to control the amount of the cooling medium which leaks from the flow passage 53 of the supply cooling medium to the flow passage 54 of the return cooling medium via the second fitting section 52B (lessen the leak amount of the cooling medium to a small one). If the return cooling medium leaks to outside via the first fitting section 51, a loss of the cooling medium occurs. However, even when the supply cooling medium leaks to the flow passage 54 of the return cooling medium via the second fitting section 52, the cooling medium is recovered in the refrigerating device 20 and can be re-used as the supply cooling medium. The rate of the cooling medium which leaks in the second fitting section 52B can be suppressed to a level at which a problem does not occur, although the rate of the cooling medium which leaks in the second fitting section 52B is higher than the rate of the cooling medium which leaks in the first fitting section 51.

Instead of forming the grooves on the second member 132 of the second rotary cylindrical body 13B, for example, the grooves may be directly formed on the outer surface of the second rotary cylindrical body 13 of FIG. 2.

Figure 4:
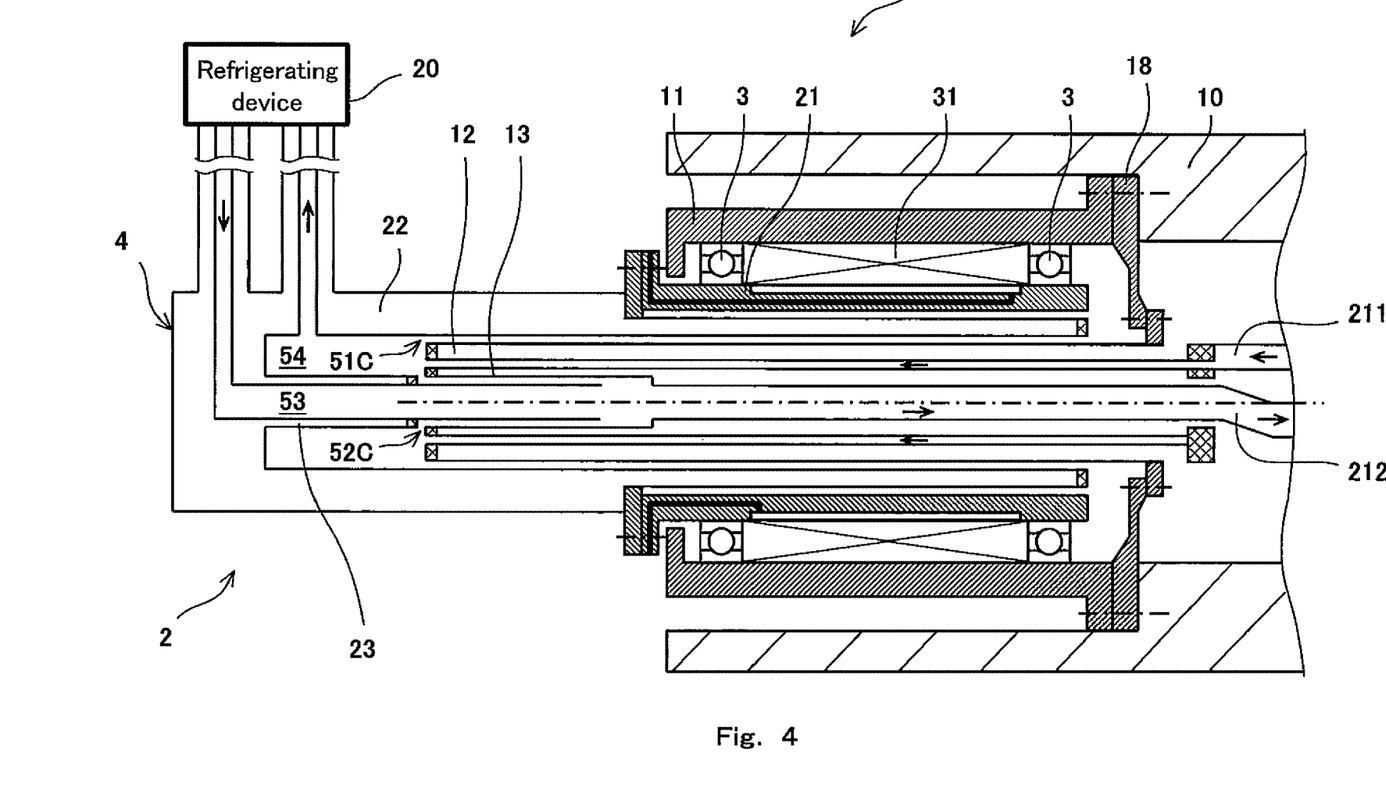
FIG. 4 is a cross-sectional side view showing the detailed structure of a cooling medium supply/discharge device according to Modified example 2 of the embodiment of the present invention.

Next, other modified example will be described. FIG. 4 is a cross-sectional side view showing the detailed structure of a cooling medium supply/discharge device according to Modified example 2 of the embodiment of the present invention. In the present modified example, the same components as those of the above described embodiment are designated by the same reference symbols and will not be described repeatedly. The cooling medium supply/discharge device according to the present modified example is different from that of the above described embodiment in that in the present modified example, a first fitting section 51C and a second fitting section 52C are positioned radially outward relative to the rotary casing 11 and the stationary casing 21.

In accordance with this configuration, also, the rotary section 1 can be integrated with the rotary shaft 10 of the superconducting rotary device, and the axial length of the machine can be reduced as compared to the conventional example.

The above described embodiment is merely exemplary. The present invention is intended to make all changes which are defined in the scope of claims and in the meaning and scope which are equivalent to the scope of the claims, as well as the above described scope.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A cooling medium supply/discharge device and a superconducting rotary device of the present invention are useful in reduction of the axial length of the machine with a simple structure.

REFERENCE SIGNS LIST 1 rotary section
2 stationary section
3 bearing
4 cooling medium supply/discharge mechanism
10 rotary shaft
11 rotary casing
12 first rotary cylindrical body
13, 13B second rotary cylindrical body
18 support member
20 refrigerating device
21 stationary casing
22 first stationary cylindrical body
23 second stationary cylindrical body
24 support member
31 magnetic fluid seal member
51, 51C first fitting section
52, 52B, 52C second fitting section
53 flow passage of supply cooling medium
54 flow passage of return cooling medium
100 superconducting rotary device
101 cooling medium supply pipe
102 cooling medium discharge pipe
103 superconducting coil
104 rotor core
120, 130, 220, 230 seal member
123 closing member
211 discharge flexible hose
212 supply flexible hose
T cooling medium supply/discharge device

The invention claimed is:

1. A cooling medium supply/discharge device of a superconducting rotary device, the cooling medium supply/discharge device being placed between a refrigerating device and a rotor including a superconducting coil in the superconducting rotary device, to supply a gaseous supply cooling medium which is supplied from the refrigerating device to the rotor and return a gaseous return cooling medium returned from the rotor to the refrigerating device, the cooling medium supply/discharge device comprising:
a cylindrical rotary casing which is rotatable together with a rotary shaft of the rotor;
a cylindrical stationary casing fixed such that the stationary casing extends inward relative to the rotary casing and coaxially with the rotary casing and relative rotation between the stationary casing and the rotary casing via a bearing is allowed to occur;

a first stationary cylindrical body which is inserted into
the stationary casing such that the first stationary cylindrical body is not rotatable;
a first rotary cylindrical body which is inserted into the
first stationary cylindrical body with a gap such that the
first rotary cylindrical body is rotatable together with
the rotary shaft;
a second stationary cylindrical body which is inserted into
the first stationary cylindrical body such that the second
stationary cylindrical body is not rotatable; and
a second rotary cylindrical body which is inserted into the
first rotary cylindrical body, fitted to the second stationary cylindrical body with a gap, and rotatable
together with the rotary shaft,
wherein a flow passage of the gaseous supply cooling
medium is provided inside the second stationary cylindrical body and the second rotary cylindrical body,
wherein a flow passage of the gaseous return cooling
medium is provided between the first stationary cylindrical body and the second stationary cylindrical body,
and between the first rotary cylindrical body and the
second rotary cylindrical body,
wherein the stationary casing and the rotary casing axially
overlap with each other,
wherein a first fitting section at which the first stationary
cylindrical body and the first rotary cylindrical body
axially overlap with each other and a second fitting
section at which the second stationary cylindrical body
and the second rotary cylindrical body axially overlap
with each other are positioned radially inward relative
to an overlap portion of the stationary casing and the
rotary casing,
wherein the bearing includes a first bearing placed at a
first axial end side of the overlap portion of the stationary casing and the rotary casing, and a second
bearing placed at a second axial end side of the overlap
portion,
wherein a space defined by the first bearing, the second
bearing, the rotary casing and the stationary casing is
sealed by a magnetic fluid seal member, and
wherein an end portion of the first rotary cylindrical body
and an end portion of the second rotary cylindrical
body, the end portion of the first rotary cylindrical body
and the end portion of the second rotary cylindrical
body being closer to the refrigerating device than other
portions of the respective first and second rotary cylindrical bodies, are located between the first bearing and
the second bearing in an axial direction.

2. The cooling medium supply/discharge device according to claim 1,
wherein the first fitting section and the second fitting
section are positioned axially inward relative to the
rotary casing.

3. The cooling medium supply/discharge device according to claim 1,
wherein each of the cylindrical bodies is constituted by a
double-walled pipe, and a space formed by the double-walled pipe is configured as a vacuum heat insulating
layer.

4. The cooling medium supply/discharge device according to claim 1,
wherein a gap of the first fitting section is in communication with a space formed between the rotary casing
and the stationary casing, and
wherein a gap of the second fitting section is in communication with a flow passage of the gaseous return
cooling medium.

5. The cooling medium supply/discharge device according to claim 1,
wherein the second stationary cylindrical body is inserted
into the second rotary cylindrical body with a gap.

6. A superconducting rotary machine comprising:
a superconducting rotary device including a rotor including a superconducting coil;
a refrigerating device which flows a gaseous cooling
medium to the rotor; and
a cooling medium supply/discharge device of the superconducting rotary device, the cooling medium supply/
discharge device being placed between the refrigerating
device and the rotor including the superconducting coil
in the superconducting rotary device, to supply a gaseous supply cooling medium which is supplied from
the refrigerating device to the rotor and return a gaseous return cooling medium returned from the rotor to
the refrigerating device, the cooling medium supply/
discharge device comprising:
a cylindrical rotary casing which is rotatable together with
a rotary shaft of the rotor;
a cylindrical stationary casing fixed such that the stationary casing extends inward relative to the rotary casing
and coaxially with the rotary casing and relative rotation between the stationary casing and the rotary casing
via a bearing is allowed to occur;
a first stationary cylindrical body which is inserted into
the stationary casing such that the first stationary cylindrical body is not rotatable;
a first rotary cylindrical body which is inserted into the
first stationary cylindrical body with a gap such that the
first rotary cylindrical body is rotatable together with
the rotary shaft;
a second stationary cylindrical body which is inserted into
the first stationary cylindrical body such that the second
stationary cylindrical body is not rotatable; and
a second rotary cylindrical body which is inserted into the
first rotary cylindrical body, fitted to the second stationary cylindrical body with a gap, and rotatable
together with the rotary shaft,
wherein a flow passage of the gaseous supply cooling
medium is provided inside the second stationary cylindrical body and the second rotary cylindrical body,
wherein a flow passage of the gaseous return cooling
medium is provided between the first stationary cylindrical body and the second stationary cylindrical body,
and between the first rotary cylindrical body and the
second rotary cylindrical body,
wherein the stationary casing and the rotary casing axially
overlap with each other,
wherein a first fitting section at which the first stationary
cylindrical body and the first rotary cylindrical body
axially overlap with each other and a second fitting
section at which the second stationary cylindrical body
and the second rotary cylindrical body axially overlap
with each other are positioned radially inward relative
to an overlap portion of the stationary casing and the
rotary casing,
wherein the bearing includes a first bearing placed at a
first axial end side of the overlap portion of the stationary casing and the rotary casing, and a second
bearing placed at a second axial end side of the overlap
portion,
wherein a space defined by the first bearing, the second
bearing, the rotary casing and the stationary casing is
sealed by a magnetic fluid seal member, and wherein an end portion of the first rotary cylindrical body and an end portion of the second rotary cylindrical body, the end portion of the first rotary cylindrical body and the end portion of the second rotary cylindrical body being closer to the refrigerating device than other portions of the respective first and second rotary cylindrical bodies, are located between the first bearing and the second bearing in an axial direction.

* * * * *